US011285446B2

(12) United States Patent
Takahashi et al.

(10) Patent No.: US 11,285,446 B2
(45) Date of Patent: Mar. 29, 2022

(54) MIXED GAS SUPPLY DEVICE

(71) Applicant: YAMAHA FINE TECHNOLOGIES CO., LTD., Hamamatsu (JP)

(72) Inventors: Hidemi Takahashi, Hamamatsu (JP); Takeshi Kato, Shimada (JP); Yuichi Doki, Hamamatsu (JP); Hisashi Ichinokiyama, Hamamatsu (JP)

(73) Assignee: YAMAHA FINE TECHNOLOGIES CO., LTD., Hamamatsu (JP)

( * ) Notice: Subject to any disclaimer, the term of this patent is extended or adjusted under 35 U.S.C. 154(b) by 432 days.

(21) Appl. No.: 16/382,611

(22) Filed: Apr. 12, 2019

(65) Prior Publication Data

US 2019/0232235 A1 Aug. 1, 2019

Related U.S. Application Data

(63) Continuation of application No. PCT/JP2017/037502, filed on Oct. 17, 2017.

(30) Foreign Application Priority Data

Oct. 17, 2016 (JP) .............................. JP2016-203695
Feb. 28, 2017 (JP) .............................. JP2017-036830

(51) Int. Cl.
*C25B 9/17* (2021.01)
*B01F 3/02* (2006.01)
(Continued)

(52) U.S. Cl.
CPC .............. *B01F 3/028* (2013.01); *B01D 53/22* (2013.01); *B01D 53/229* (2013.01); *B01F 3/02* (2013.01);
(Continued)

(58) Field of Classification Search
CPC .. C25B 9/17; C25B 9/00; C25B 15/02; C25B 1/04
See application file for complete search history.

(56) References Cited

U.S. PATENT DOCUMENTS 2,012,046 A * 8/1935 Jewett ....................... C25B 9/73
205/432
4,022,234 A 5/1977 Dobritz

FOREIGN PATENT DOCUMENTS

JP S5180062 A 7/1976
JP H06220531 A 8/1994
(Continued)

OTHER PUBLICATIONS

Office Action issued in Korean Appln. No. 10-2019-7010718 dated Nov. 26, 2020. English machine translation provided.
(Continued)

*Primary Examiner* — Zulmariam Mendez
(74) *Attorney, Agent, or Firm* — Rossi, Kimms & McDowell LLP

(57) ABSTRACT

A mixed gas supply device includes: a hydrogen gas generation unit that includes a hydrogen generator, the hydrogen generator generating hydrogen gas by decomposition of water and supplying the hydrogen gas; a nitrogen gas generation unit that includes a filter, the filter separating nitrogen gas from air and supplying the nitrogen gas; a gas mixing unit that mixes the supplied hydrogen gas and the supplied nitrogen gas and generates mix gas including the hydrogen gas and the nitrogen gas; and a single base on which the hydrogen gas generation unit, the nitrogen gas generation unit, and the gas mixing unit are mounted, the hydrogen gas generation unit, the nitrogen gas generation unit, and the gas mixing unit being integrated. The gas mixing unit supplies the generated mixed gas to outside.

12 Claims, 8 Drawing Sheets

(51) Int. Cl.
    *B01D 53/22*     (2006.01)
    *B01F 11/00*     (2006.01)
    *B01F 15/04*     (2006.01)
    *B01F 13/00*     (2006.01)
    *G01M 3/20*     (2006.01)
    *C25B 1/04*     (2021.01)
    *C25B 9/19*     (2021.01)
    *C25B 9/73*     (2021.01)

(52) U.S. Cl.
    CPC ...... *B01F 11/0077* (2013.01); *B01F 13/0033* (2013.01); *B01F 15/04* (2013.01); *B01F 15/0429* (2013.01); *C25B 1/04* (2013.01); *C25B 9/19* (2021.01); *C25B 9/73* (2021.01); *G01M 3/20* (2013.01); *B01F 2215/0037* (2013.01)

(56) References Cited

FOREIGN PATENT DOCUMENTS

| | | |
|---|---|---|
| JP | H10128102 A | 5/1998 |
| JP | 2006159168 A | 6/2006 |
| JP | 2007038179 A | 2/2007 |
| JP | 4329921 B2 | 9/2009 |
| JP | 2012047651 A | 3/2012 |
| JP | 2013075277 A | 4/2013 |
| WO | 2016132517 A1 | 8/2016 |

OTHER PUBLICATIONS

International Search Report issued in Intl. Appln. No PCT/JP2017/037502 dated Jan. 9, 2018. English translation provided.
Written Opinion issued in Intl. Appln. No. PCT/JP2017/037502 dated Jan. 9, 2018.
Office Action issued in Japanese Appln. No. 2016-203695 dated Dec. 4, 2018. English machine translation provided.
Office Action issued in Japanese Appln. No. 2017-036830 dated Dec. 4, 2018. English machine translation provided.
Office Action issued in Japanese Appln. No. 2017-036830 dated Jul. 9, 2019. English machine translation provided.

\* cited by examiner

MIXED GAS SUPPLY DEVICE

CROSS-REFERENCE TO RELATED APPLICATION

Priority is claimed on Japanese Patent Application No. 2016-203695, filed Oct. 17, 2016, and Japanese Patent Application No. 2017-36830, filed Feb. 28, 2017, the content of which is incorporated herein by reference.

BACKGROUND OF THE INVENTION

Field of the Invention

The present invention relates to a device for supplying a mixed gas used, for example, as an inspection gas in a leak inspection (leak test).

Description of Related Art

Hollow components that store various gases and liquids, piping for transferring gases and liquids, and the like, are often required to have a sufficient gas tightness. Therefore, inspections for checking whether or not leakage occurs are normally performed with respect to the components and piping at the final stage of the manufacturing process thereof, at the shipping stage, or at a stage before use. In this type of leak inspection, it is common to introduce an inspection gas into an inspection object (work piece), and to detect the presence of leakage of the inspection gas by using a gas detection device on the outside of the inspection object.

Helium (He) gas is generally used as such a leak inspection gas. However, it is not necessary to use expensive 100% helium gas. Normally, a dilution gas in which the helium gas is diluted to a predetermined low concentration by mixing a dilution gas such as air with a high-concentration helium gas, is generally used as the leak inspection gas. Already proposed in Japanese Patent Publication No. 4329921 (hereinafter Patent Document 1) is a supply device of such a leak inspection gas, for example, which is a mixed gas supply device for mixing and diluting a high-concentration helium gas with air, and then supplying the diluted gas to a leak inspection device.

At leak inspection sites, such as factories in which leak inspection is performed with respect to various hollow components and the like, immediate supply of helium gas by a permanent piping to a chosen site is usually not possible. Consequently, in order to supply helium gas to a device such as the supply device described in Patent Document 1, a helium gas cylinder is needed to be used as the supply source thereof.

The use of a cylinder as a helium gas supply source gives rise to the following problems.

When a cylinder becomes empty, it is necessary to interrupt the inspection to exchange the cylinder with a new one. Since such cylinders are heavy, a considerable time and effort is spent on the transportation and installation. Of course, in reality it is common for a plurality of cylinders to be prepared beforehand at the leak inspection site, and to switch to another cylinder when a cylinder becomes empty. Even in this case, the same problem exists in that cylinders must be transported to and installed at the leak inspection site.

Furthermore, when a cylinder is used as the helium gas supply source, leak inspection involves not only the site at which the leak inspection is carried out, but also the cylinder storage location. Consequently, when performing a leak inspection, it is necessary to not only manage the cylinders at the inspection site, but also at a cylinder storage location that is separate from the inspection site. Therefore, the time and effort to perform the management cannot be ignored.

Further, there is also a problem that helium gas is expensive. Consequently, the costs associated with leak inspections inevitably become even higher.

The use of hydrogen gas as the leak inspection gas instead of diluted helium gas is being considered. When hydrogen gas is used, a cylinder storing 100% hydrogen gas must be purchased, or a cylinder storing a low-concentration hydrogen gas, which has been diluted beforehand to a low-concentration at which the gas does not become flammable, must be purchased. However, 100% hydrogen gas is dangerous, and is unsuitable as a leak inspection gas. On the other hand, there is a problem that low-concentration hydrogen gas cylinders are expensive, and time is required for procurement since they are not widely distributed. Consequently, in reality the practical use of a device for supplying a low-concentration hydrogen gas that is optimal for leak inspection at a leak inspection site has not yet been achieved.

SUMMARY OF THE INVENTION

The present invention has been made in view of the above circumstances. An exemplary object of the present invention is to provide a mixed gas supply device that, by using hydrogen gas and nitrogen gas as a mixed gas, minimizes the disadvantages associated with the use of gas cylinders by not using high-pressure gas cylinders as a gas source as much as possible, while at the same time achieving a reduction in running costs.

A mixed gas supply device according to a first aspect of the present invention includes: a hydrogen gas generation unit that includes a hydrogen generator, the hydrogen generator generating hydrogen gas by decomposition of water and supplying the hydrogen gas; a nitrogen gas generation unit that includes a filter, the filter separating nitrogen gas from air and supplying the nitrogen gas; a gas mixing unit that mixes the supplied hydrogen gas and the supplied nitrogen gas and generates mix gas including the hydrogen gas and the nitrogen gas; and a single base on which the hydrogen gas generation unit, the nitrogen gas generation unit, and the gas mixing unit are mounted, the hydrogen gas generation unit, the nitrogen gas generation unit, and the gas mixing unit being integrated. The gas mixing unit supplies the generated mixed gas to outside.

A mixed gas supply device according to a second aspect of the present invention includes: an enclosure; a water tank that is provided in the enclosure and stores water; a hydrogen generator that generates hydrogen gas by decomposition of the water stored in the water tank and supplies the hydrogen gas; an air intake port that is provided on the enclosure, and takes in air to introduce the air inside the enclosure; a filter that is provided in the enclosure, and separates nitrogen gas from the introduced air and supplies the nitrogen gas; a mixing unit that is provided in the enclosure, and mixes the supplied hydrogen gas and the supplied nitrogen gas and generates mix gas including the hydrogen gas and the nitrogen gas; and a mixed gas supply port that is provided on the enclosure and supplies the generated mix gas to outside of the enclosure.

According to an embodiment of the present invention, by minimizing the disadvantages associated with the use of gas cylinders by not using high-pressure gas cylinders as a gas supply source as much as possible, cost reductions can be achieved in leak inspections and the like, and more efficient operations can also be achieved.

DETAILED DESCRIPTION OF THE INVENTION

Hereunder, embodiments of the present invention will be described in detail with reference to the drawings.

Figure 1:
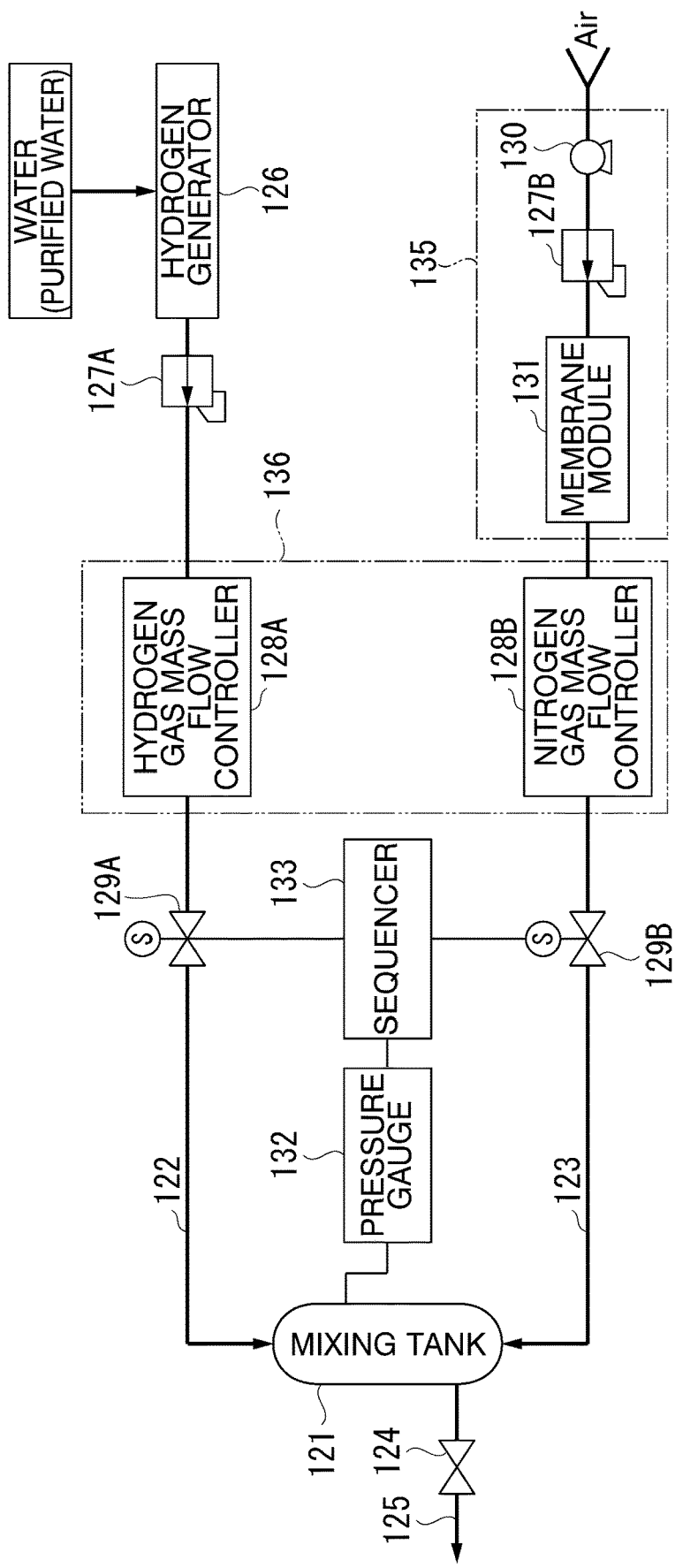
FIG. 1 is a block diagram showing a diluted hydrogen gas generation device according to an embodiment A1 of the present invention.

FIG. 1 shows a diluted hydrogen gas generation device (mixed gas supply device) according to an embodiment A1 of the present invention. The embodiment A1 represents an example of a case where a leak inspection gas is generated by diluting high-concentration hydrogen gas with nitrogen gas.

In the example shown in FIG. 1, a high-concentration hydrogen gas is introduced into a mixing tank (mixing unit, gas mixing unit) 121 via a hydrogen gas supply channel (hydrogen gas piping) 122. Furthermore, nitrogen gas is introduced into the mixing tank 121 as a dilution gas via a nitrogen gas supply channel (nitrogen gas piping, dilution gas supply channel) 123, which represents a dilution gas supply channel. The mixing tank 121 mixes the high-concentration hydrogen gas and nitrogen gas (that is to say, dilutes the high-concentration hydrogen gas with nitrogen gas). The mixing tank 121 supplies the mixed gas or a low-concentration hydrogen gas which has been diluted with nitrogen gas, to a leak inspection device (not shown in the figure) via an on-off valve (mixed gas supply on-off valve) 124 and an inspection gas delivery piping (mixed gas supply port) 125. In the following, the high-concentration hydrogen gas described above is simply referred to as hydrogen gas.

In the hydrogen gas supply channel 122, a pressure reducing valve 127A, a hydrogen gas mass flow controller (first mass flow controller) 128A, and a hydrogen gas on-off valve (on-off valve) 129A are arranged in that order between a hydrogen generator (hydrogen gas generation unit) 126 on the upstream end thereof and the mixing tank 121. In the nitrogen gas supply channel 123, a pressure reducing valve 127B, a nitrogen gas separation membrane module (nitrogen gas generation unit, filter, nitrogen separation device) 131, a nitrogen gas mass flow controller (second mass flow controller) 128B, and a nitrogen gas on-off valve (on-off valve) 129B are arranged in that order between an air pump 130 on the upstream end thereof and the mixing tank 121.

A pressure gauge 132 is connected to the mixing tank 121. The pressure gauge 132 constantly measures the pressure inside the mixing tank 111. The output of the pressure gauge 132 (mixing tank internal pressure detection signal) is transmitted to a sequencer 133. The sequencer 133 controls the opening and closing of the on-off valves 129A and 129B according to the mixing tank internal pressure detection signal.

In such an embodiment A1, the air pump 130 and the membrane module 131 constitute a dilution gas supply source 135 for supplying a dilution gas. The air pump 130 takes in air from the outside, and pressurizes and forces out the air. The membrane module 131 functions as a nitrogen separation device that separates nitrogen gas from air. That is to say, in the embodiment A1, a nitrogen gas cylinder is not used as a dilution gas supply source. Instead, air is taken in from the atmosphere, and the nitrogen gas separated from the air is used as a dilution gas.

In the embodiment A1, the mass flow controllers 128A and 128B are respectively arranged in the hydrogen gas supply channel 122 and the nitrogen gas supply channel 123. These are devices that instantaneously control a flow rate by measuring a mass flow rate of a fluid (hydrogen gas or nitrogen gas in the present embodiment). The mass flow controllers 128A and 128B constitute a gas flow rate ratio controller (gas flow rate ratio control means, gas flow control unit, gas flow controller) 136 for controlling the ratio between the flow rate of hydrogen gas introduced into the mixing tank 121 via the hydrogen gas supply channel 122, and the flow rate of dilution gas introduced toward the mixing tank 121 from the dilution gas supply source (nitrogen gas generation unit) 135.

Figure 2:
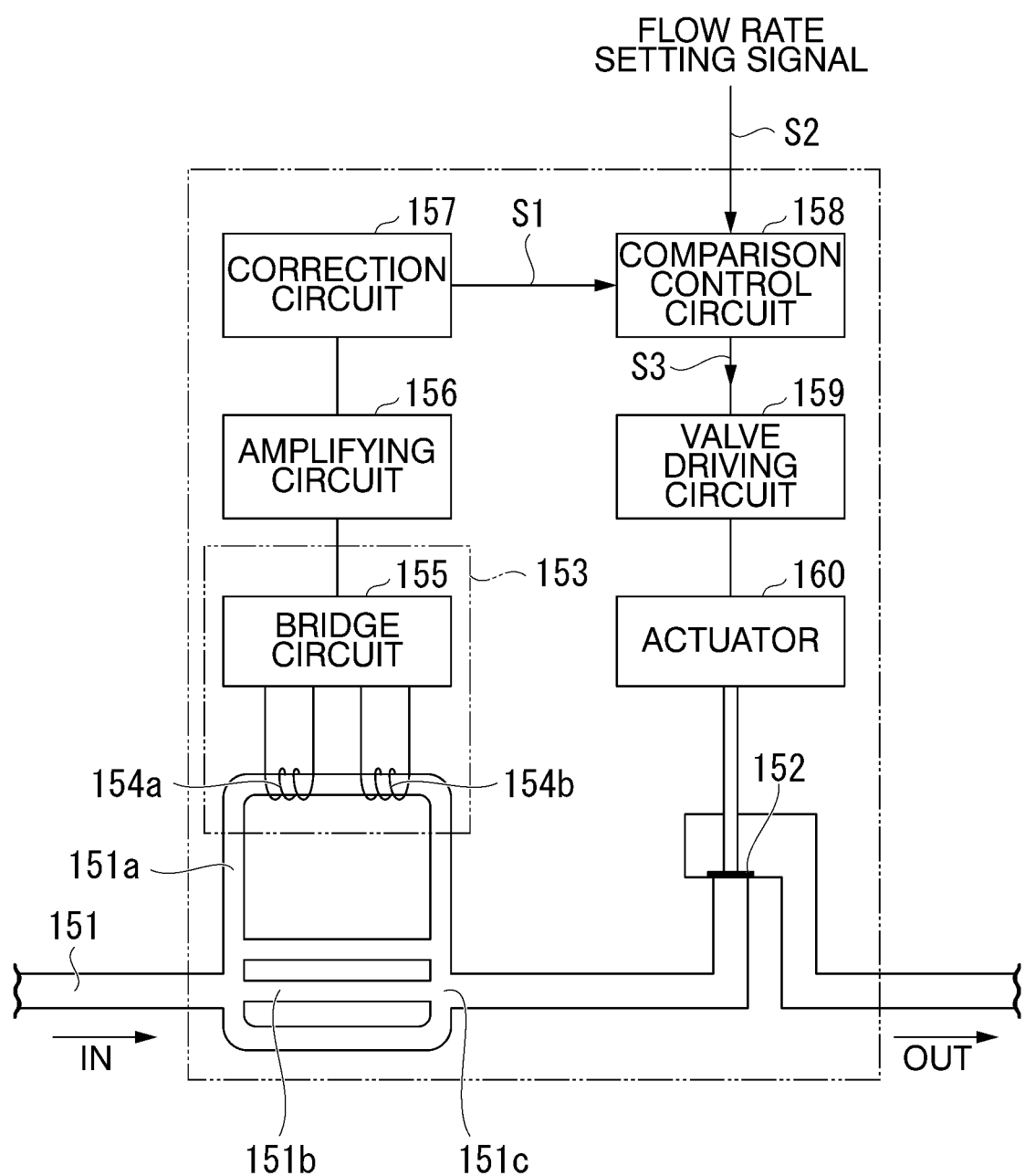
FIG. 2 is a schematic view showing a principle of an example of a mass flow controller used in the embodiment A1.

Commercially available, conventional mass flow controllers may be used as the mass flow controllers 128A and 128B. A principle of an example of a typical mass flow controller is shown in FIG. 2, and the outline thereof will be described below.

A mass flow controller is basically described as follows. A channel 151 is branched into a sensor side channel 151a and a bypass channel 151b which are formed by a capillary. A flow rate control valve 152 is provided on the downstream side of a junction 151c of the channels 151a and 151b. The mass flow rate of a fluid passing through the sensor side channel 151a is measured by a flow rate sensor 153. The degree of opening of the flow rate control valve 152 is controlled based on the measurement result thereof. Specifically, the flow rate sensor 153 is configured by winding resistors 154a and 154b respectively around the upstream side and the downstream side of the sensor side channel 151a, and incorporating the resistors 154a and 154b thereof into a bridge circuit 155. The output of the bridge circuit 155 is amplified by an amplifying circuit 156, and provided as a flow rate measurement signal S1 to a comparison control circuit 158 via a correction circuit 157. The flow rate measurement signal S1 thereof is compared with a flow rate setting signal S2 from the outside, and a difference signal S3 thereof is provided to a valve driving circuit 159. The valve driving circuit 159 drives a solenoid-type or piezo-type valve actuator 160 according to the difference signal S3 to control the degree of opening of the flow rate control valve 152.

When a fluid passes through the sensor side channel 151*a* described above, a temperature difference occurs between the resistors 154*a* and 154*b* on the upstream side and downstream side. A difference in the electrical resistances of the resistors 154*a* and 154*b* occurs due to the temperature difference. The flow rate measurement signal S1 corresponding to the mass flow rate of the fluid passing through the sensor side channel 151*a* is obtained as a result of the difference output. Using such a principle, the mass flow controller is able to immediately and accurately control the mass flow rate of the fluid flowing through the channel 151 by means of the flow rate control valve 152, such that it becomes the flow rate set by the flow rate setting signal S2.

In the embodiment A1 shown in FIG. 1, such a mass flow controller is inserted as hydrogen gas and nitrogen gas mass flow controllers 128A and 128B into the hydrogen gas supply channel 122 and the nitrogen gas supply channel 123 respectively to set each of the flow rates. As a result, the ratio between the flow rate of hydrogen gas flowing through the hydrogen gas supply channel 122 and the flow rate of nitrogen gas flowing through the nitrogen gas supply channel 123 can be controlled.

The overall functions of the above embodiment A1 shown in FIG. 1 will be described.

The hydrogen concentration of a diluted hydrogen gas is determined beforehand. The diluted hydrogen gas will be supplied to a leak inspection device (not shown in the figure) from the mixing tank 121 and used as inspection gas. The hydrogen concentration in the leak inspection gas is not particularly limited. The hydrogen concentration of the inspection gas can be appropriately selected according to leak inspection aspects, the shape of the inspection object, the gas leakage detection accuracy, and the like. The hydrogen concentration of the inspection gas is generally preferably in the range of 1% to 20%, and more preferably in the range of 1% to 5%. When an object is placed in an open space without housing it inside a vacuum chamber and its leak inspection is performed, the leaked hydrogen is directly discharged into the atmosphere if a leak is present. Consequently, for safety reasons it is desirable to set the hydrogen concentration of the inspection gas to a relatively low concentration, such as 5% or less. In the following description, a case where a diluted hydrogen gas having a hydrogen concentration of 5% is generated will be described as a representative example.

In the device according to the embodiment A1 shown in FIG. 1, the ratio between the output flow rate of the hydrogen gas mass flow controller (first mass flow controller) 128A and the output flow rate of the nitrogen gas mass flow controller (second mass flow controller) 128B is set beforehand to a mixing ratio (for example, 5:95) of the inspection gas.

When a leak inspection is performed, the inspection gas (a gas diluted with nitrogen such that the hydrogen concentration becomes 5%) stored in the mixing tank 121 is continuously supplied to a leak inspection device (not shown in the figure) via the on-off valve 124 and the inspection gas delivery piping 125. Meanwhile, the pressure inside the mixing tank 121 is measured by the pressure gauge 132, and the pressure measurement signal thereof is transmitted to the sequencer 133. When the pressure inside the mixing tank 121 falls below a predetermined pressure, the on-off valves 129A and 129B are opened. Then, as a result of a supply operation described below, hydrogen gas is introduced into the mixing tank 121 via the hydrogen gas supply channel 122, and nitrogen gas is introduced into the mixing tank 121 via the nitrogen gas supply channel 123.

On the upstream end of the hydrogen gas supply channel 122, water (purified water or pure water) is decomposed by the hydrogen generator 126 and hydrogen gas is taken in. The hydrogen gas is introduced to the hydrogen gas mass flow controller 128A via the pressure reducing valve 127A. Then hydrogen gas flows out at a flow rate set beforehand in the hydrogen gas mass flow controller 128A, and is fed to the mixing tank 121 via the on-off valve 129A.

On the upstream end of the nitrogen gas supply channel 123, air is taken from the outside by the air pump 130. The air is fed to the nitrogen gas separation membrane module 131 via the pressure reducing valve 127B, and nitrogen gas is separated from the air. The nitrogen gas is introduced to the nitrogen gas mass flow controller 128B. Then nitrogen gas flows out at a flow rate set beforehand in the nitrogen gas mass flow controller 128B, and is fed to the mixing tank 121 via the on-off valve 129B.

Therefore, hydrogen gas and nitrogen gas are introduced into the mixing tank 121 at a mixing ratio corresponding to the ratio between the flow rate set in the hydrogen gas mass flow controller 128A and the flow rate set in the nitrogen gas mass flow controller 128B. The pressure inside the mixing tank 121 rises as a result of the introduced hydrogen gas and nitrogen gas. Then, once the pressure inside the mixing tank 121 detected by the pressure gauge 132 reaches a predetermined pressure, the on-off valves 129A and 129B are closed by the sequencer 133 and the supply is stopped.

In this manner, when the pressure of the mixing tank 121 falls, hydrogen gas and nitrogen gas are supplied at a predetermined ratio such that an inspection gas (diluted hydrogen gas) having a predetermined hydrogen concentration is generated, enabling leak testing to be performed without interruption.

In the embodiment A1, the hydrogen generator 126 is not particularly limited as long as it is a device that performs electrolysis of high-purity water (purified water) to generate hydrogen. An arbitrary device such as a hydrogen generator using a known solid state electrolyte membrane can be used as the hydrogen generator 126.

In the embodiment A1, the dilution gas supply source 135 uses a membrane module, which represents a nitrogen separation device, and the membrane module separates nitrogen gas from air by the so-called membrane separation method. Alternatively, a configuration may also be used in which nitrogen gas is separated from air by the cryogenic separation method, the PSA method (adsorption method), or like. Among these methods, it is most advantageous from a cost perspective to apply the membrane separation method using a membrane module.

In the diluted hydrogen gas generation device according to the embodiment A1 above, the hydrogen gas supply source uses a hydrogen generator 126, which generates hydrogen by the decomposition of water. Furthermore, the dilution gas supply source uses a configuration that separates nitrogen gas from air by means of a membrane module or the like. Therefore, expensive gas cylinders that store these gases are unnecessary. Consequently, the running costs associated with leak inspections can be reduced. Furthermore, since an operation that transports and installs heavy gas cylinders becomes unnecessary, the time and effort associated with the operation thereof is no longer required. Moreover, it is also not necessary to store spare gas tanks. As a result, a storage space for gas cylinders becomes unnecessary, and management of the spare tanks in the storage space is also no longer needed. Therefore, management is sufficiently carried out solely at the leak inspection site, which enables a so-called on-site operation. Further, the entire device can be housed in a single enclosure, which also enables a single box construction to be achieved. Moreover, in contrast to the control method of the gas mixing ratio (dilution) described in Patent Document 1 (a method of control that uses the gas flow rate that actually flows into the mixing tank), the method sets and controls the gas mixing ratio (dilution) according to a gas flow rate ratio in the gas supply channels before the gases flow into the mixing tank. Consequently, the mixing ratio is well-controlled, and the likelihood of a situation such as the gas mixing ratio deviating from a target (overshooting) occurring can be reduced.

Figure 3:
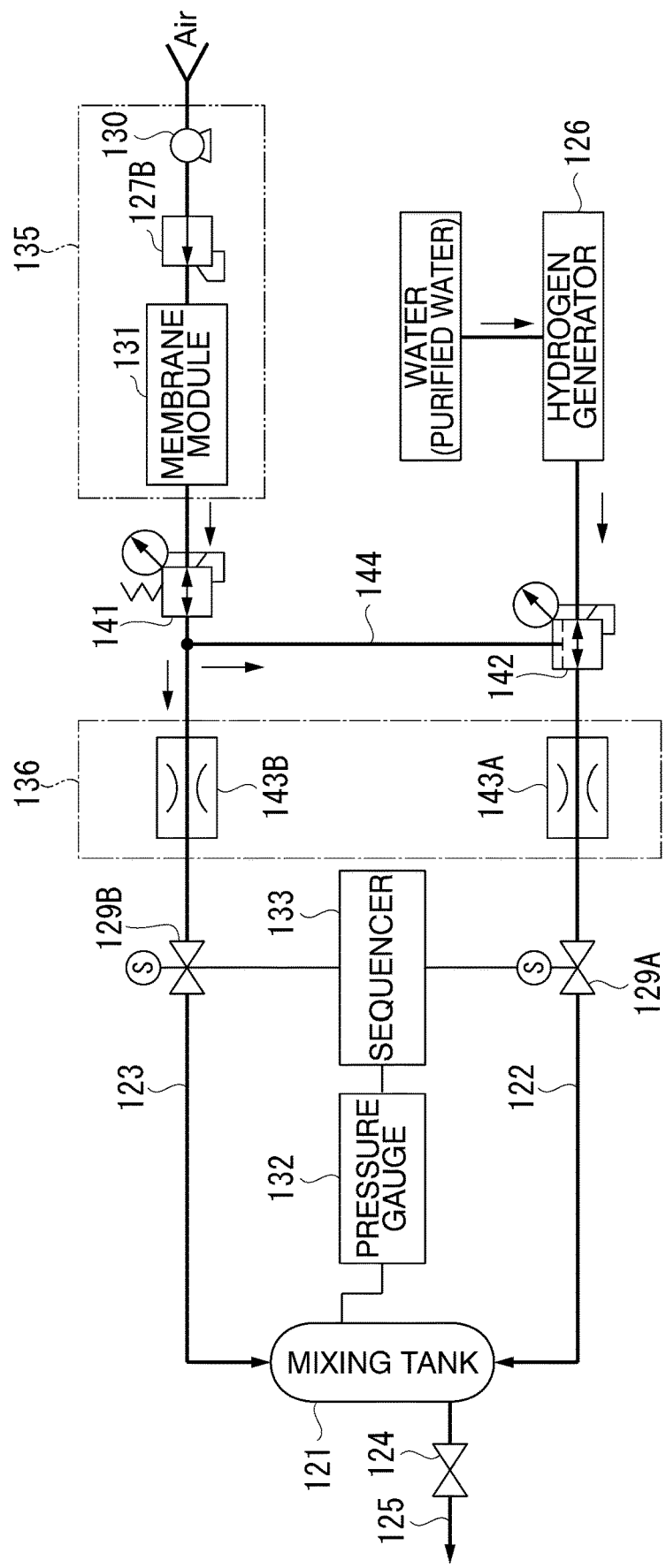
FIG. 3 is a block diagram showing a diluted hydrogen gas generation device according to an embodiment A2 of the present invention.

FIG. 3 shows a diluted hydrogen gas generation device according to an embodiment A2 of the present invention. The embodiment A2, in the same manner as the embodiment A1, represents an example of a case where a leak inspection gas is generated by diluting high-concentration hydrogen gas with nitrogen gas.

In the embodiment A2, sonic nozzles 143A and 143B are used as the gas flow rate ratio controller 136 instead of the mass flow controllers 128A and 128B in the embodiment A1. Further, the diluted hydrogen gas generation device according to the embodiment A2 is provided with a configuration in which a direct-acting regulator 141 and an external pilot regulator 142 are combined in order to achieve equal gas pressures flowing into the sonic nozzles 143A and 143B.

That is to say, in FIG. 3, the hydrogen gas supply channel 122 includes the external pilot regulator 142 and the hydrogen gas sonic nozzle (first sonic nozzle) 143A between the hydrogen generator 126 and the on-off valve 129A. The external pilot regulator 142 and the hydrogen gas sonic nozzle 143A are inserted in that order from the upstream side toward the downstream side. The nitrogen gas supply channel 123 includes the direct-acting regulator 141 and the nitrogen gas sonic nozzle (second sonic nozzle) 143B between the membrane module 131 of the nitrogen gas supply source 135 and the on-off valve 129B. The direct-acting regulator 141 and the nitrogen gas sonic nozzle 143B are inserted in that order from the upstream side toward the downstream side. The output pressure of the direct-acting regulator 141 of the nitrogen gas supply channel 123 is applied as a pilot pressure to the external pilot regulator 142 of the hydrogen gas supply channel 122 via a split channel 144.

A sonic nozzle will be described. A sonic nozzle has a throat portion whose inner diameter is reduced to a small diameter in the channel of the nozzle. When the ratio between the upstream side pressure and the downstream side pressure of a gas is kept below a critical pressure ratio, the flow speed at the throat portion (the minimum aperture portion of the nozzle) is fixed at a sonic speed. As a result, the sonic nozzle is able to generate a constant flow rate at all times as long as the inflow side pressure and the aperture of the throat portion are constant. In such a sonic nozzle, it is possible to obtain a predetermined mass flow rate with a high accuracy. The flow rate on the downstream side of the sonic nozzle under a constant inflow side pressure depends on the aperture of the throat portion. Consequently, by determining beforehand the ratio between the throat portion aperture of the hydrogen gas sonic nozzle 143A inserted into the hydrogen gas supply channel 122 and the throat portion aperture of the nitrogen gas sonic nozzle 143B inserted into the nitrogen gas supply channel 123, it is possible to set the ratio between the flow rate of hydrogen gas and the flow rate of nitrogen gas introduced into the mixing tank 121.

In the sonic nozzle, the outflow side flow rate is proportional to the inflow side pressure. Consequently, if the gas pressure on the inflow side fluctuates, the outflow gas flow rate also fluctuates. Therefore, in the embodiment A2, the direct-acting regulator 141 is provided upstream of the nitrogen gas sonic nozzle 143B in the nitrogen gas supply channel 123. As a result of applying the output pressure of the direct-acting regulator 141 as a pilot pressure to the external pilot regulator 142 in the hydrogen gas supply channel 122 via the split channel 144, the output pressures of the regulators 141 and 142 are controlled to equal pressures. Due to the above configuration, the input pressure of the nitrogen gas sonic nozzle 43B and the input pressure of the hydrogen gas sonic nozzle 43A are maintained in a state where they are equal at all times.

Ultimately, in the embodiment A2 shown in FIG. 3, the input pressure of the hydrogen gas sonic nozzle 143A and the input pressure of the nitrogen gas sonic nozzle 143B are made equal by combining the direct-acting regulator 141 and the external pilot regulator 142. Further, the ratio between the throat portion aperture of the hydrogen gas sonic nozzle 143A and the throat portion aperture of the nitrogen gas sonic nozzle 143B inserted into the nitrogen gas supply channel 123 is set to an appropriate ratio. As a result, the ratio between the flow rate of hydrogen gas and the flow rate of nitrogen gas introduced into the mixing tank 121 is appropriately controlled. Consequently, hydrogen gas and nitrogen gas are mixed in an appropriate ratio in the mixing tank 121, and the required low-hydrogen concentration diluted hydrogen gas (inspection gas) can be generated.

In the example of FIG. 3, the direct-acting regulator 141 is inserted into the nitrogen gas supply channel 123, and the external pilot regulator 142 is inserted into the hydrogen gas supply channel 122. Alternatively, in contrast to the example of FIG. 3, the direct-acting regulator 141 may be inserted into the hydrogen gas supply channel 122, and the external pilot regulator 142 may be inserted into the nitrogen gas supply channel 123. In this case, the output pressure of the direct-acting regulator 141 in the hydrogen gas supply channel 122 is applied as a pilot pressure to the external pilot regulator 142 of the nitrogen gas supply channel 123.

The output (outlet) flow rate of the sonic nozzle depends on the minimum aperture of the throat portion. Consequently, by exchanging the nozzle to one having a different throat portion aperture, it is possible to change the output flow rate. Therefore, in a case where a change in the mixing ratio (dilution of hydrogen gas by nitrogen gas) of an inspection gas is desired, a number of nozzles having different throat portion apertures may be prepared beforehand, and the sonic nozzle may be exchanged with one having a different throat portion aperture. As a result of exchanging the nozzle, the output flow rate of either or both of the sonic nozzles 143A and 143B is changed, thereby enabling the mixing ratio to be changed. In this case, it is possible to change the output flow rate by exchanging just the throat portion rather than the entire sonic nozzle device.

In a case where a change in the mixing ratio (dilution of hydrogen gas by nitrogen gas) of an inspection gas is desired, rather than depending on exchanging the sonic nozzle mentioned above or the throat portion thereof, it is also possible to change the mixing ratio by changing the opening time of the on-off valves 129A and 129B.

In the diluted hydrogen gas generation device according to the embodiment A2, in a similar manner to the diluted hydrogen gas generation device according to the embodiment A1, a hydrogen gas cylinder and a nitrogen gas cylinder are unnecessary. Consequently, as described previously, the running costs associated with leak inspections can be reduced, and an operation that transports and installs heavy gas cylinders also becomes unnecessary. Further, the storage and management of gas cylinders is unnecessary, enabling leak inspections to be performed as an on-site operation. Moreover, a single box construction of the entire device becomes possible. In addition, in a similar manner to the embodiment A1, the mixing ratio is well-controlled, and the likelihood of a situation such as the gas mixing ratio (hydrogen dilution) deviating from a target (overshooting) occurring can be reduced.

In the case of the device described in Patent Document 1, in the actual control, the on-off valve is not necessarily closed immediately when the pressure becomes higher than a certain value after the supply into the mixing tank is started. Consequently, there is a concern that the pressure inside the tank may become excessively high. In contrast, in the case of the embodiment A2 of the present invention shown in FIG. 3, the responsiveness is better than that of the device described in Patent Document 1. Therefore, the likelihood of a situation such as the pressure in the mixing tank becoming excessively high occurring is low.

In the embodiments A1 and A2 above, a case where nitrogen gas is used as the dilution gas was described. However, it is in no way limited to this. Gases other than nitrogen gas, for example, an inert gas such as Ar gas, or $CO_2$ gas is permissible for use as the dilution gas, as long as the gas is capable of diluting hydrogen and does not adversely affect the leak inspection object, or potentially cause a hydrogen explosion.

When an inert gas or $CO_2$ gas is used as the dilution gas, a gas cylinder storing an inert gas, or a gas such as $CO_2$ gas, may be used as the dilution gas supply source instead of the membrane module 131 for nitrogen separation in the embodiment A1 of FIG. 1 or the embodiment A2 of FIG. 3. Also in this case, hydrogen gas is generated by decomposition of water by the hydrogen generator. Consequently, a hydrogen gas cylinder is unnecessary as the hydrogen gas supply source. Therefore, the total number and types of cylinders can be reduced relative to a case where a hydrogen gas supply cylinder is used. Consequently, the time and effort required for exchanging cylinders can be minimized, and furthermore, the costs associated with cylinder use can be reduced.

Further, in a case where the leak inspection object (work piece) is made of a material that does not easily oxidize, or if the oxidation of the object is not a problem, the use of air as the dilution gas is also permissible. In this case, it is desirable for hydrogen to be diluted with air such that the hydrogen concentration is less than 4%, or preferably 3% or less. It is known that, in a case where air and hydrogen gas are mixed, there is a likelihood of a hydrogen explosion when the hydrogen concentration is 4% to 75%. Therefore, when hydrogen is mixed with air such that the hydrogen concentration is less than 4%, or preferably 3% or less, the likelihood of a hydrogen explosion can be avoided.

In a case where air is used as the dilution gas in this manner, the nitrogen separation device, such as the membrane module 131 in the embodiment A1 of FIG. 1 or the embodiment A2 of FIG. 3, can be omitted. Therefore, when air is used as the dilution gas, further cost reductions can be achieved.

In the description above, it has been assumed that a diluted gas (hydrogen-containing mixed gas) obtained using the diluted hydrogen gas generation device according to the embodiment of the present invention was used as a leak inspection gas. However, the embodiment of the present invention is in no way limited to such a case. A diluted hydrogen gas obtained using the device according to an embodiment of the present invention may be used for other applications.

Hereunder, an embodiment B of the present invention will be described in detail with reference to the drawings.

Figure 4:
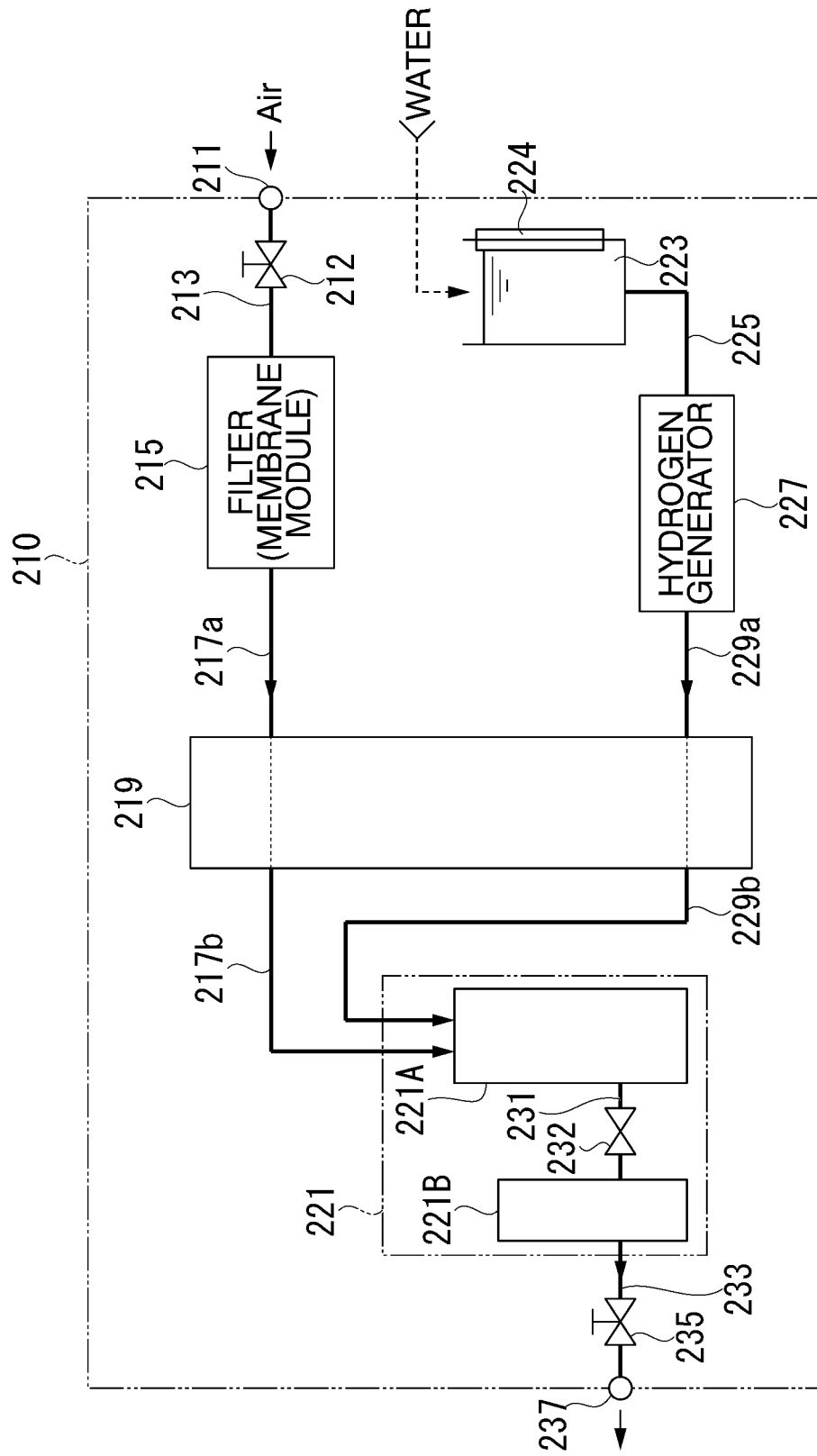
FIG. 4 is a block diagram showing a principle of a flow configuration of a mixed gas supply device according to an embodiment B of the present invention.
Figure 5:
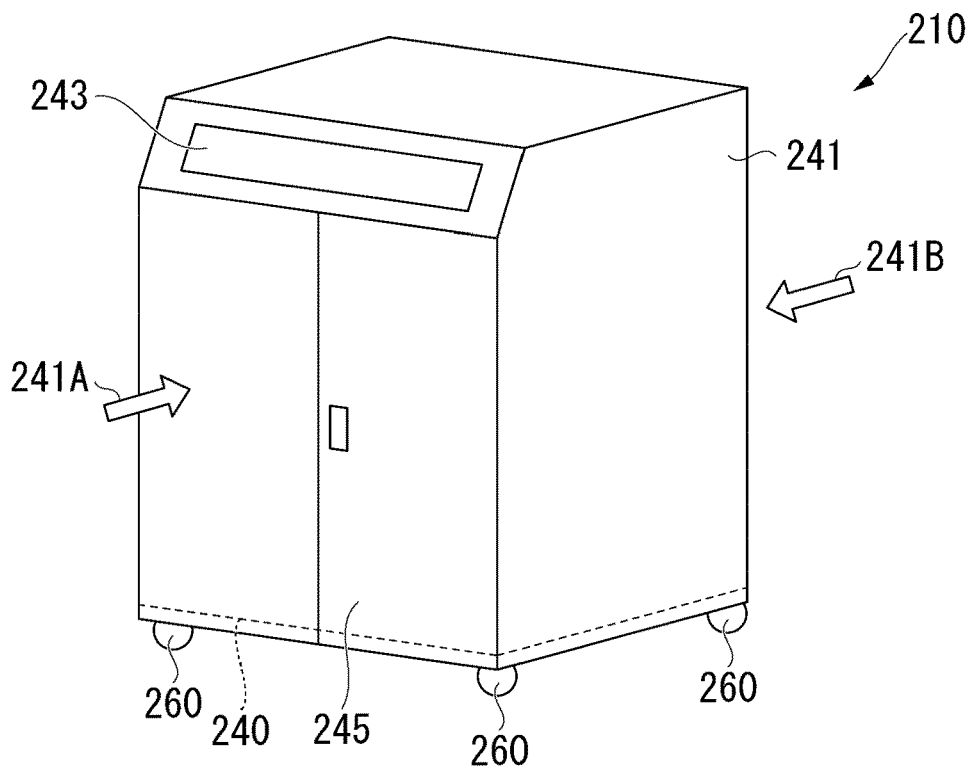
FIG. 5 is a perspective view showing a three-dimensional structure of the mixed gas supply device according to the embodiment B of the present invention.
Figure 6:
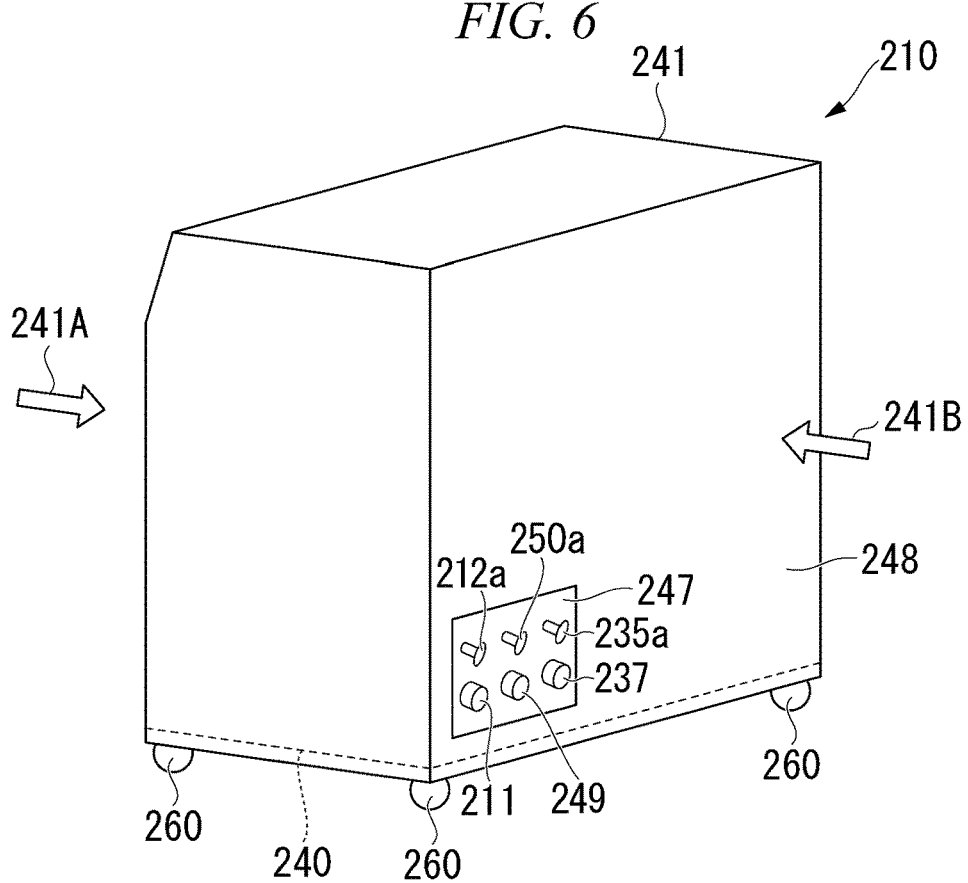
FIG. 6 is a block diagram showing a three-dimensional structure of the mixed gas supply device according to the embodiment B of the present invention from the opposite side of FIG. 5.

FIG. 4 shows a principle of a configuration (flow configuration) of a mixed gas supply device according to the embodiment B of the present invention. FIG. 5 to FIG. 8 show a three-dimensional structure of the mixed gas supply device according to the embodiment B of the present invention. The mixed gas supply device 210 according to the embodiment B shown in FIG. 4 to FIG. 8 generates a hydrogen and nitrogen mixed gas containing a low-concentration hydrogen gas by mixing a high-concentration hydrogen gas generated by decomposition of water, and nitrogen gas separated from air, and is described as an example of a device for supplying the mixed gas thereof to a leak inspection device as an inspection gas.

Firstly, a principle of a flow configuration of a mixed gas supply device 210 according to the embodiment B of the present invention will be described with reference to FIG. 4.

In FIG. 4, an air intake port 211 is an intake port for taking in air from an air piping or the like in a factory where gas leak inspections are performed. The mixed gas supply device 210 includes, in the interior thereof, an air intake on-off valve 212 configured to be manually opened and closed, an air supply piping 213, and a filter (membrane module; nitrogen gas generation unit) 215 representing a nitrogen gas generation unit. The air intake port 211 is connected to the filter 215 via the air intake on-off valve 212 and the air supply piping 213. The filter 215 is, for example, a membrane module (membrane separation nitrogen gas generation device), and generates a comparatively high-concentration nitrogen gas by separating nitrogen gas from the air that has been taken in.

The nitrogen gas generated by the filter 215 is introduced to a gas flow controller (gas flow rate ratio control unit) 219 via a nitrogen gas piping (nitrogen gas supply channel) 217a, and is further introduced into a mixing unit (gas mixing unit) 221 mentioned below via a nitrogen gas piping (nitrogen gas supply channel) 217b.

Further, a water tank 223 is provided inside the mixed gas supply device 210, into which purified water or pure water (simply referred to as water below) can be supplied from the outside of the device. A water level gauge 224 for detecting the amount of stored water is attached to the water tank 223. The water level gauge 224 generates an alarm (signal or sound) when the water inside the water tank 223 falls below a certain level.

The water inside the water tank 223 is introduced into a hydrogen generator 227 (hydrogen gas generation unit) via a water supply piping 225. The hydrogen generator 227 generates hydrogen gas by the electrolysis of water. The hydrogen gas generated by the hydrogen generator 227 is introduced to the gas flow controller 219 via a hydrogen gas piping (hydrogen gas supply channel) 229a, and is further introduced into the mixing unit 221 via a hydrogen gas piping (hydrogen gas supply channel) 229b.

The gas flow controller 219 controls the gas flow rates such that a predetermined mixing ratio between hydrogen gas and nitrogen gas can be obtained in the mixing unit 221, and adjusts the gas pressures fed to the mixing unit. The gas flow controller 219 is configured by a flow rate control valve, a pressure control device, and the like, not shown in the figures.

The mixing unit 221 includes a large-capacity first mixing tank 221A and a small-capacity second mixing tank 221B. That is to say, the first mixing tank 221A has a relatively larger capacity than the second mixing tank 221B. Both nitrogen gas from the nitrogen gas piping 217b and high-concentration hydrogen gas from the hydrogen gas piping 229b are introduced into the first mixing tank 221A. In the first mixing tank 221A, a mixed gas is generated as a result of nitrogen gas and hydrogen gas being mixed. The mixed gas thereof is introduced into the second mixing tank 221B via a mixed gas intermediate piping 231 and a mixed gas intermediate valve 232. Homogenization of the mixed gas proceeds in the second mixing tank 221B.

In this manner, a mixed gas is generated in the mixing unit in which hydrogen gas and nitrogen gas are homogeneously mixed. In other words, a low-hydrogen concentration mixed gas (a hydrogen and nitrogen mixed gas with a low-hydrogen concentration) is generated, in which a high-concentration hydrogen gas is diluted with nitrogen gas.

A mixed gas outflow port of the second mixing tank 221B is connected to a mixed gas supply port 237 via a mixed gas supply piping 233 and a mixed gas supply on-off valve 235. The mixed gas supply on-off valve 235 is configured to be manually opened and closed. The mixed gas supply port 237 is a part to which a flexible piping, and the like, is connected for introducing the mixed gas (leak inspection gas) to an external leak inspection device (not shown in the figure).

FIG. 5 to FIG. 8 show a three-dimensional structure of the mixed gas supply device 210 according to the embodiment B of the present invention.

The constituent members of the mixed gas supply device 210 are mounted on a base 240, and are also housed inside an enclosure (cabinet) 241. The enclosure 241 is integrated with the base 240, and has a square box shape for example. The base 240 may be either a plate or a frame. The enclosure 241 includes an operation and display panel 243 on an upper portion of a front side surface 241A side thereof. Furthermore, a front door 245 that can be opened and closed is provided on a lower side of the operation and display panel 243.

A lower portion of a rear side surface 241B of the enclosure has the air intake port 211 and the mixed gas supply port 237 shown in FIG. 4 provided as a supply and exhaust unit 247. The air intake port 211 and the mixed gas supply port 237 are exposed to the outside of the enclosure 241. The supply and exhaust unit 247 also has an exhaust port 249, not shown in FIG. 4, which is provided with being exposed to the outside. The exhaust port 249 discharges excess diluted hydrogen gas to the outside during hydrogen concentration control. An opening and closing operation unit 212a of the air intake on-off valve 212 shown in FIG. 4 is provided in the vicinity of the air intake port 211, and is exposed to the outside of the device. Furthermore, an opening and closing operation unit 235a of the mixed gas supply on-off valve 235 shown in FIG. 4 is provided in the vicinity of the mixed gas supply port 237, and is exposed to the outside of the device. An operation unit 250a of the discharge on-off valve is provided in the vicinity of the exhaust port 249, and is exposed to the outside of the device.

The sections of the rear side surface 241B of the enclosure 241 other than the supply and discharge unit 247 are configured by a rear door 248. The rear door 248 can be opened and closed at the time of maintenance and inspections.

The four corners of the base 240 have casters 260 attached such that the device 210 can be moved in any horizontal 360 degree direction on a plane such as a floor.

Figure 7:
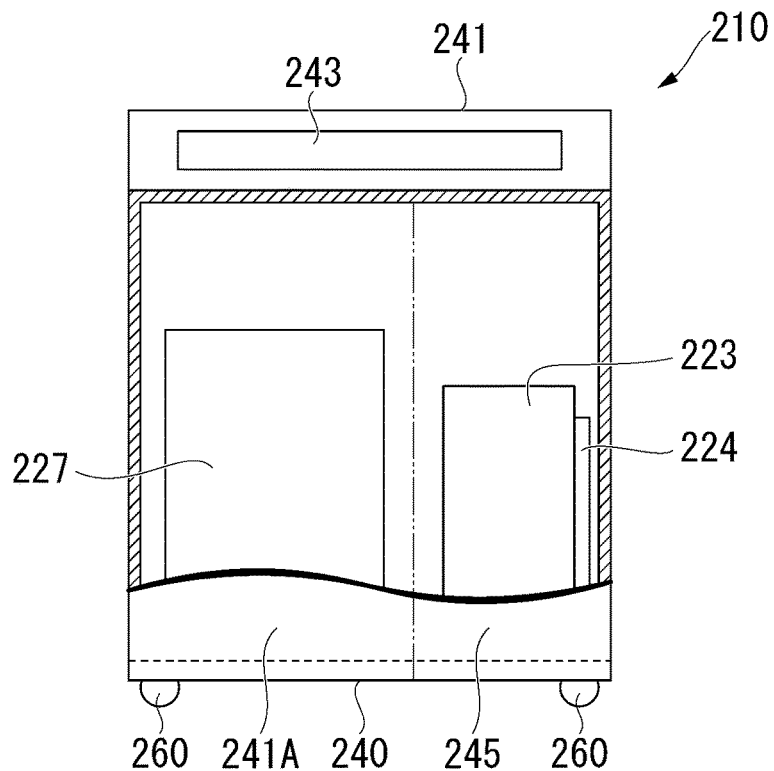
FIG. 7 is a cutaway front view showing a three-dimensional structure of the mixed gas supply device according to the embodiment B of the present invention in a state where a front surface of the enclosure thereof is cut away.
Figure 8:
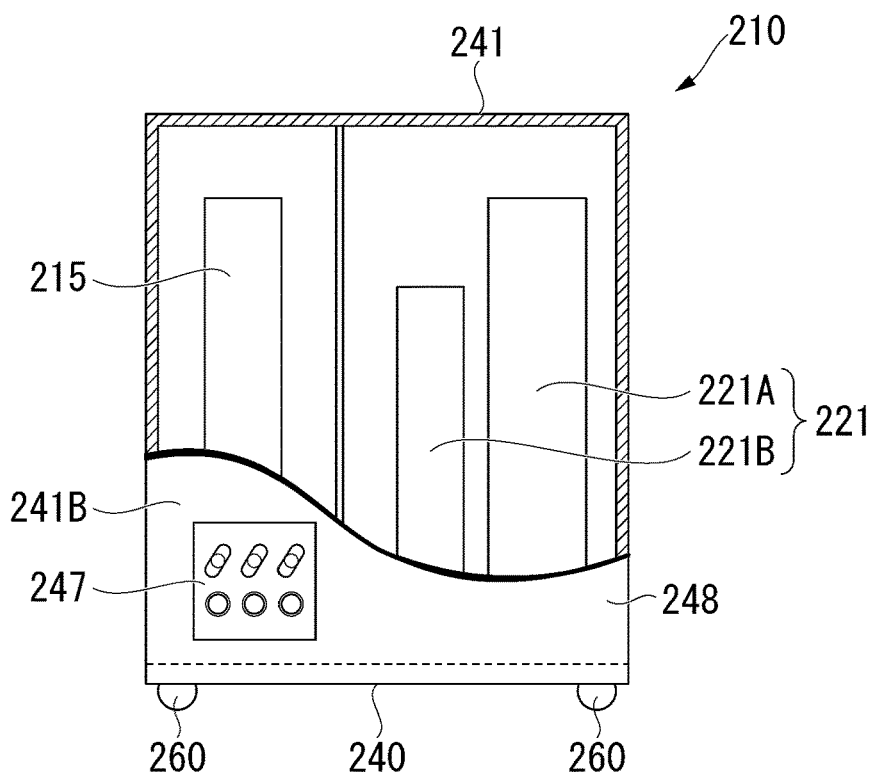
FIG. 8 is a cutaway rear view showing a three-dimensional structure of the mixed gas supply device according to the embodiment B of the present invention in a state where a rear surface of the enclosure thereof is cut away.

The constituent elements and piping shown in FIG. 4 are housed and fixed inside the enclosure 241. The internal structure of the enclosure 241 in the embodiment B is shown in FIG. 7 and FIG. 8. FIG. 7 and FIG. 8 show only the main elements among the constituent elements shown in FIG. 4, and does not show other elements such as the piping, the valves, and the controllers.

The enclosure 241 includes the front side surface 241A that has the front door 245, and the rear side surface 241B. In the embodiment B, the water tank 223 and the hydrogen generator 227 shown in FIG. 4 are arranged inside the enclosure 241 in the vicinity of the front door 245. Water (purified water or pure water) can be charged into the water tank 223 from the outside in a state where the front door 245 is opened. The filter (membrane module) 215 serving as a nitrogen gas generation unit, and the first mixing tank 221A and the second mixing tank 221B that configure the mixing unit 221, are arranged inside the enclosure 241 on the rear side surface 241B side. As already described with reference to FIG. 4, air from the air intake port 211 is introduced to the input of the filter (membrane module) 215 via the air intake on-off valve 212. As shown in FIG. 4, the output (outlet) of the second mixing tank 221B is connected by a piping to the mixed gas supply port 237 via the mixed gas supply on-off valve 235.

A case where a leak inspection is performed with respect to various hollow components, and the like, using a mixed gas supplied from the mixed gas supply device 210 according to the embodiment B shown in FIG. 4 to FIG. 8 will be described below in terms of the operation, function, and usage method of the mixed gas supply device 210.

The mixed gas supply device 210 is arranged beforehand at a site where leak inspections are performed (for example, a site in a manufacturing factory of hollow components, or a site in a shipping inspection factory). Here, the base 240 of the mixed gas supply device 210 according to the embodiment B includes the casters 260, and because the entire enclosure can be moved on a floor, it can be simply and easily arranged near the leak inspection site.

Water (purified water or pure water) is placed beforehand in the water tank 223 prior to the operation of the mixed gas supply device 210 by opening the front door 245 of the enclosure 241. Furthermore, the air intake port 211 is brought into a state where outside air is taken in from the air intake port 211 by connecting an air piping arranged in the factory of the leak inspection site, to the air intake port 211.

When the mixed gas supply device 210 is operated, the water introduced from the water tank 223 to the hydrogen generator 227 is electrolyzed in the hydrogen generator 227 to generate a high-concentration hydrogen gas. The obtained high-concentration hydrogen gas is introduced into the first mixing tank 221A of the mixing unit 221 via the gas flow controller 219. The air taken in from the air intake port 211 is introduced to the filter (membrane module) 215 serving as the nitrogen gas generation unit, and oxygen is almost entirely removed from the air, which is then introduced as nitrogen gas into the first mixing tank 221A of the mixing unit 221 via the gas flow controller 219.

The gas flow controller 219 controls the hydrogen gas flow rate and the nitrogen gas flow rate under a mutual relationship such that the mixing ratio of hydrogen gas and nitrogen gas in the mixed gas to be finally obtained becomes a predetermined ratio. It is preferable for the gas flow controller 219 to not only control the gas flow rate ratio, but to also appropriately control the pressure of hydrogen gas and the pressure of nitrogen gas flowing into the first mixing tank 221A.

The introduced hydrogen gas and nitrogen gas are mixed inside the first mixing tank 221A of the mixing unit 221. Further, homogenization of the mixed gas thereof proceeds as a result of the mixed gas being introduced into the second mixing tank 221B. Then, the mixed gas fed from the second mixing tank 221B reaches the mixed gas supply port 237. As a result, a mixed gas of hydrogen gas and nitrogen gas, or in other words, an inspection gas in which hydrogen gas is diluted with nitrogen gas, can be supplied to a leak inspection device on the outside. Then an inspection that detects leakage of hydrogen gas can be performed in the leak inspection device.

When the mixed gas is fed from the first mixing tank 221A of the mixing unit 221, the mixed gas can sometimes be in a state where the hydrogen gas and the nitrogen gas are not necessarily homogeneously mixed. Therefore, the mixed gas leaving the first mixing tank 221A is further fed into the second mixing tank 221B. The fed mixed gas undergoes further mixing inside the second mixing tank 221B. The mixed gas thereof is fed from the second mixing tank 221B and supplied to a leak inspection device on the outside via the supply port 237. As a result, a mixed gas that is more homogeneously mixed can be used in the leak inspection device.

The gas flow controller 219 controls the hydrogen gas flow rate and the nitrogen gas flow rate under a mutual relationship such that the mixing ratio of hydrogen gas and nitrogen gas in the mixed gas becomes a predetermined ratio as mentioned above. That is to say, in the embodiment B, the hydrogen gas flow rate and the nitrogen gas flow rate are controlled such that the hydrogen concentration contained in the hydrogen and nitrogen mixed gas becomes a concentration suitable for use as an inspection gas in a leak inspection device. Control of the gas flow rates is mentioned below.

The hydrogen concentration in an inspection gas is not particularly limited in a case where it is used as the inspection gas in a leak inspection device, and can be appropriately selected according to leak inspection aspects, the shape of the inspection object, the gas leakage detection accuracy, and the like. The hydrogen concentration of the inspection gas is generally preferably in the range of 1% to 20%, and more preferably in the range of 1 to 5%. When leak inspection of an object is performed directly in an external environment without placing the inspection object inside a vacuum chamber, the leaked hydrogen is directly discharged into the atmosphere if a leak is present. Consequently, it is preferable for the hydrogen concentration of the inspection gas to be in a low-concentration range at which the gas does not become flammable. For example, in ISO 10156:2010, a hydrogen concentration range at which the gas does not become flammable is specified, and it is preferable to set the hydrogen concentration of the test gas within the specified range thereof.

When it is detected by the water level gauge 224 that the amount of water inside the water tank 223 has fallen below a predetermined level, an alarm is issued by way of an alarm sound, an alarm display, or the like. When the alarm is issued, the front door 245 of the enclosure 241 can be opened to supply water to the water tank 223.

In the mixed gas supply device 210 according to embodiment B above, the hydrogen gas supply source uses the hydrogen generator 227, which generates hydrogen by the decomposition of water. The dilution nitrogen gas supply source uses a configuration that separates nitrogen gas from air by means of the filter (membrane module) 215. Therefore, expensive gas cylinders that store such gases are unnecessary. That is to say, water as a hydrogen generation source can be easily supplied to the water tank 223 anywhere. On the other hand, air piping is often provided as factory piping near the leak inspection site. In this case, air can be taken in as the nitrogen supply source by simply connecting the factory air piping to the air intake port 211. When a factory air piping is not available, air from outside the device can be directly taken in from the air intake port 211.

In this manner, the mixed gas supply device according to the embodiment B does not use gas cylinders, and uses water and air that are readily available anywhere as gas supplies. Consequently, the running costs associated with leak inspections can be reduced. Furthermore, since an operation that transports and installs heavy gas cylinders becomes unnecessary, the time and effort associated with the operation thereof is no longer required. Moreover, it is also not necessary to store spare gas tanks. As a result, a storage space for gas cylinders becomes unnecessary, and management of the spare tanks in the storage space is also no longer needed. Therefore, management is sufficiently carried out solely at the leak inspection site, which enables a so-called on-site operation.

Further, in the embodiment B, the entire device is housed in a single enclosure as a single box construction. Consequently, the device not only has a good external appearance, but also has a lower likelihood of damage to the constituent members, piping, valves, and the like, of the units stored inside the enclosure during transport and movement of the device. Furthermore, the internal constituent members, piping, valves, and the like, can be protected from dust in the environment.

Moreover, the casters 260 are provided in the embodiment B. As a result, the entire device can be simply and easily moved on a floor by pushing the enclosure 241 in a horizontal direction. Therefore, the entire device can be easily moved near the leak inspection site as necessary without placing an excessive burden on an operator or using a crane. Furthermore, the device 210 can be easily removed from the site after completion of the leak inspection and the like.

Next, a more concrete example of the mixed gas supply device according to the embodiment B of the present invention, and in particular, a flow configuration of a concrete example of the gas flow controller 219 mentioned above, is shown in FIG. 9. In this example, as mentioned below, the gas flow controller 219 includes, as main control elements, a direct-acting regulator 251, an external pilot regulator 252, sonic nozzles 253A and 253B as a gas flow rate ratio controller (gas flow rate ratio control means) 253, and a sequencer 254. Among the elements shown in FIG. 9, the same elements as those shown in FIG. 4 are given the same reference symbols as FIG. 4, and the details thereof are omitted.

Figure 9:
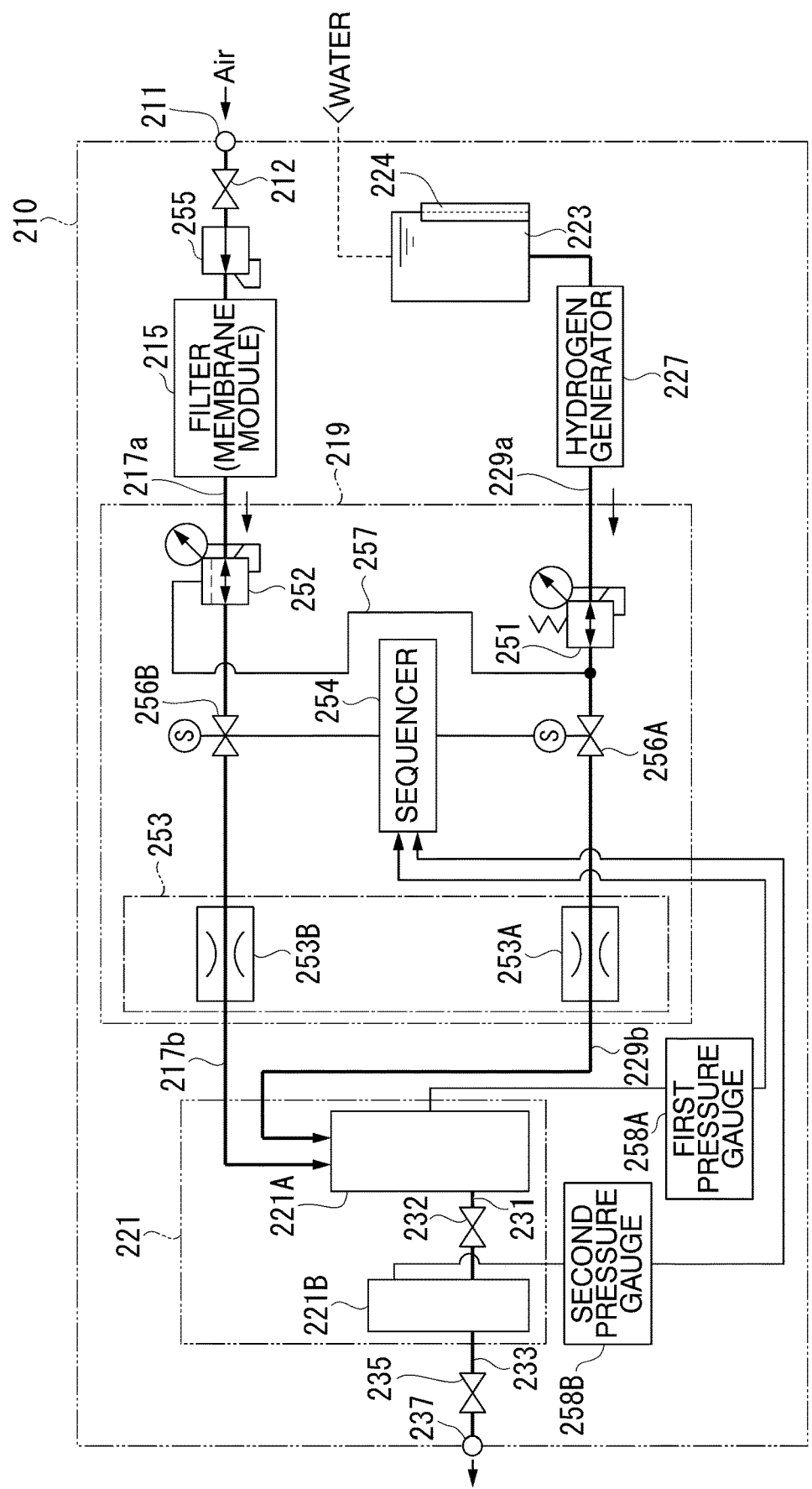
FIG. 9 is a block diagram showing a detailed example of the flow configuration of the mixed gas supply device according to the embodiment B of the present invention.

In the example of FIG. 9, the air intake port 211 is connected to the filter (membrane module) 215 which represents a nitrogen gas generation unit, via the air intake on-off valve 212 and the pressure reducing valve 255. The nitrogen gas separated by the filter (membrane module) 215 is introduced to the input (inlet) of the external pilot regulator 252. The output (outlet) of the external pilot regulator 252 is connected to the input (inlet) of the sonic nozzle 253B via the on-off valve 256B. Water from the water tank 223 is introduced to the hydrogen generator 227. The high-concentration hydrogen gas generated by the electrolysis of water by the hydrogen generator 227 is introduced to the input (inlet) of the direct-acting regulator 251.

The direct-acting regulator 251 and the external pilot regulator 252 described above are used to make the pressure of hydrogen gas flowing into the sonic nozzle (first sonic nozzle) 253A on the hydrogen gas channel side and the pressure of nitrogen gas flowing into the sonic nozzle (second sonic nozzle) 253B an equal pressure. That is to say, the output (outlet) of the direct-acting regulator 251 on the hydrogen gas channel side is not only connected to the sonic nozzle 253A via the on-off valve 256A, but the output pressure thereof is applied as a pilot pressure to the external pilot regulator 252 on the nitrogen gas channel side via the split channel 257.

The output (outlet) of the sonic nozzles 253A and 253B is connected to the first mixing tank 221A of the mixing unit 221. Furthermore, the pressure inside the first mixing tank 221A of the mixing unit 221 is detected by a first pressure gauge 258A, and the pressure inside the second mixing tank 221B is also detected by a second pressure gauge 258B. The pressure signals detected by the pressure gauges 258A and 258B are input to the sequencer 254. The opening and closing of the on-off valves 256A and 256B is controlled by the sequencer 254 according to the pressure signals.

As a result of determining the ratio between the throat portion aperture of the sonic nozzle 253A inserted into the hydrogen gas side channel and the throat portion aperture of the sonic nozzle 253B inserted into the nitrogen gas side channel beforehand, it is possible to set the ratio between the flow rate of hydrogen gas and the flow rate of nitrogen gas introduced into the mixing unit 221.

In the sonic nozzle, the outflow side flow rate is proportional to the inflow side pressure. Consequently, if the gas pressure on the inflow side fluctuates, the outflow gas flow rate also fluctuates. Therefore, in the example of FIG. 9, the direct-acting regulator 251 is provided upstream of the sonic nozzle 253A in the hydrogen gas side channel. As a result of applying the output pressure of the direct-acting regulator 251 as a pilot pressure to the external pilot regulator 252 in the nitrogen gas side channel via the split channel 257, the output pressures of the regulators 251 and 252 are controlled to equal pressures. Due to the above configuration, the input pressure of the nitrogen gas side sonic nozzle 253B and the input pressure of the hydrogen gas side sonic nozzle 253A are maintained in a state where they are equal at all times.

Ultimately, in the example shown in FIG. 9, the input pressure of the hydrogen gas side sonic nozzle 253A and the input pressure of the nitrogen gas side sonic nozzle 253B are made equal by combining the direct-acting regulator 251 and the external pilot regulator 252. Further, the ratio between the throat portion aperture of the hydrogen gas side sonic nozzle 253A and the throat portion aperture of the nitrogen gas side sonic nozzle 253B is set to an appropriate ratio. As a result, the ratio between the flow rate of hydrogen gas and the flow rate of nitrogen gas introduced into the mixing unit 221 is appropriately controlled. Consequently, hydrogen gas and nitrogen gas are mixed in an appropriate ratio in the mixing unit 221, and the required low-hydrogen concentration mixed gas (diluted hydrogen gas) can be generated.

In FIG. 9, the direct-acting regulator 251 is inserted into the hydrogen gas side channel, and the external pilot regulator 252 is inserted into the nitrogen gas channel. Alternatively, in contrast to the example of FIG. 9, the direct-acting regulator may be inserted into the nitrogen gas side channel, and the external pilot regulator may be inserted into the hydrogen gas side channel. In this case, the output pressure of the direct-acting regulator in the nitrogen gas side channel is applied as a pilot pressure to the external pilot regulator of the hydrogen gas side channel.

As mentioned above, as a result of exchanging the nozzle, the output flow rate of either or both of the sonic nozzles 253A and 253B is changed, thereby enabling the mixing ratio to be changed. In this case, it is possible to change the output flow rate by exchanging just the throat portion rather than the entire sonic nozzle device.

As mentioned above, it is also possible to change the mixing ratio (dilution of hydrogen gas by nitrogen gas) of the mixed gas by changing the opening time of the on-off valves 256A and 256B.

The three-dimensional structure (three-dimensional configuration) of the mixed gas supply device 100 described above, whose flow configuration is shown in FIG. 9, may be the same structure as shown in FIG. 5 to FIG. 8.

Figure 10:
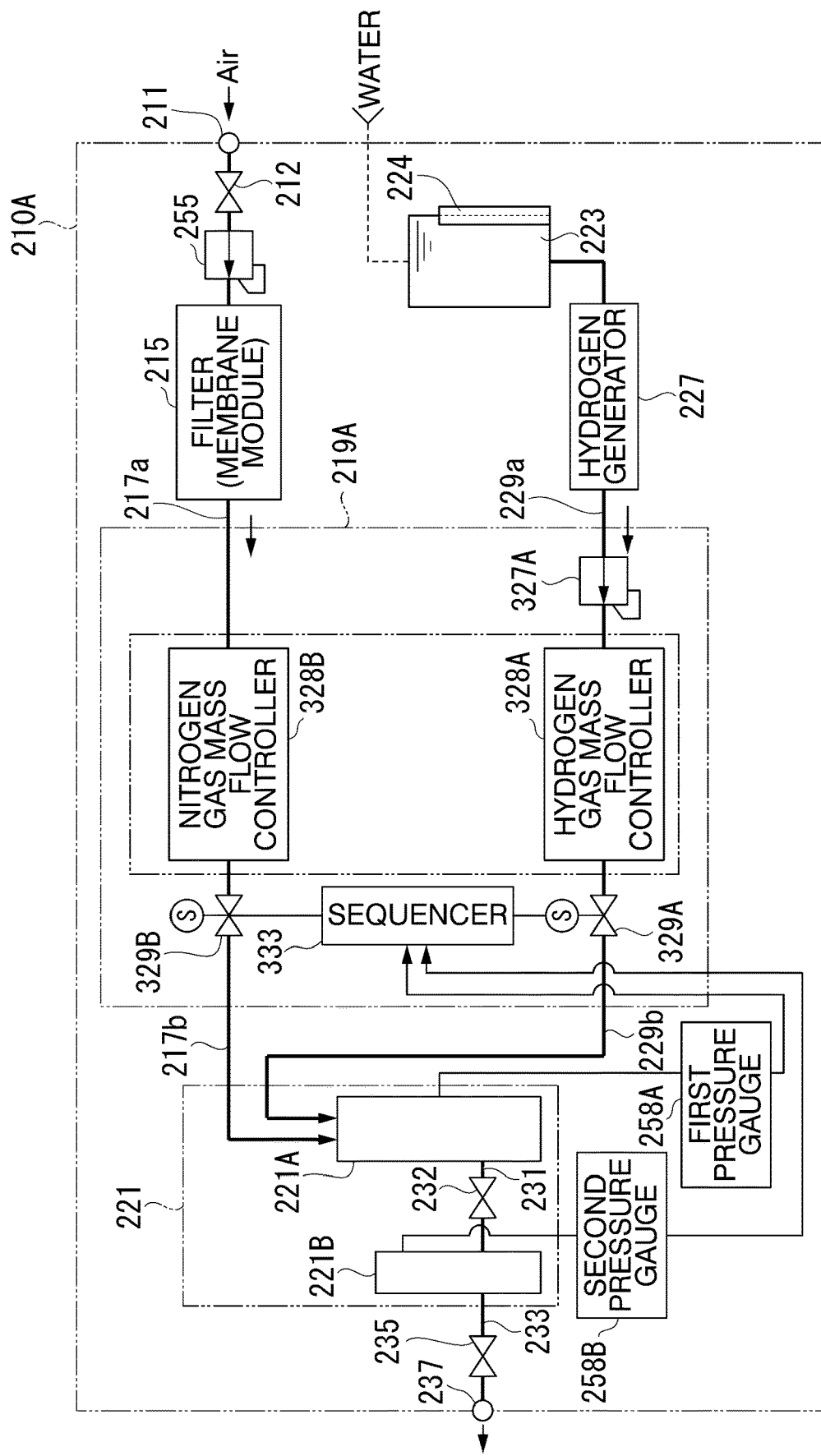
FIG. 10 is a block diagram showing another detailed example of the flow configuration of the mixed gas supply device according to the embodiment B of the present invention.

Next, a mixed gas supply device 210A will be described as a modified example of the mixed gas supply device with reference to FIG. 10. The mixed gas supply device 210A differs from the mixed gas supply device 210 shown in FIG. 9 in the aspect that it includes a gas flow controller 219A instead of the gas flow controller 219. Among the elements shown in FIG. 10, the same elements as those shown in FIG. 9 are denoted by the same reference symbols as FIG. 9, and the details thereof will be omitted.

The mixed gas supply device 210A includes a pressure reducing valve 327A, a hydrogen gas mass flow controller (first mass flow controller) 328A, a nitrogen gas mass flow controller (second mass flow controller) 328B, a hydrogen gas on-off valve 329A, and a nitrogen gas on-off valve 329B. The pressure reducing valve 327A, the hydrogen gas mass flow controller 328A, the nitrogen gas mass flow controller 328B, the hydrogen gas on-off valve 329A, and the nitrogen gas on-off valve 329B respectively have the same configurations and functions as the pressure reducing valve 127A, the hydrogen gas mass flow controller 128A, the nitrogen gas mass flow controller 128B, the hydrogen gas on-off valve 129A, and the nitrogen gas on-off valve 129B. The mixed gas supply device 210A further includes a sequencer 333. The sequencer 333 receives pressure signals detected by the pressure gauges 258A and 258B, and controls the opening and closing of the valves 329A and 329B according to the pressure signals thereof.

In the description above, it is assumed that a mixed gas containing hydrogen and nitrogen (a gas in which hydrogen gas is diluted with nitrogen gas) supplied from the mixed gas supply device according to the embodiment of the present invention is used as a leak inspection gas. However, the embodiment of the present invention is in no way limited to such a case. A mixed gas obtained using the device according to the embodiment of the present invention may be used for other applications.

(1): A mixed gas supply device according to an embodiment of the present invention includes: a hydrogen gas generation unit that generates hydrogen gas; a nitrogen gas generation unit that generates nitrogen gas; and a gas mixing unit that mixes hydrogen gas introduced from the hydrogen gas generation unit and nitrogen gas introduced from the nitrogen gas generation unit. The gas mixing unit supplies gas mixed in the gas mixing unit to the outside.

Hydrogen gas can be simply and easily obtained by the electrolysis of water. Furthermore, nitrogen gas can be easily obtained by separation from air. Therefore, a mixed gas for use in leak inspections and the like can be supplied without using a high-pressure gas cylinder as a gas source.

(2): In the mixed gas supply device according to (1), the hydrogen gas generation unit may include a hydrogen generator that generates hydrogen gas by decomposition of water.

(3): In the mixed gas supply device according to (1), the nitrogen gas generation unit may include a filter that separates nitrogen gas from air.

(4): The mixed gas supply device according to any one of (1) to (3) may further include a single base on which the hydrogen gas generation unit, the nitrogen gas generation unit, and the gas mixing unit are mounted. The hydrogen gas generation unit, the nitrogen gas generation unit, and the gas mixing unit may be integrated.

In such a mixed gas supply device according to (4), the units that constitute the mixed gas supply device thereof are integrated by being mounted on a single stage. Therefore, the entire device can be easily transported and moved. Consequently, the entire device can be easily positioned near a leak inspection site as needed.

(5): The mixed gas supply device according to (4) may further include a single enclosure provided on the base. The hydrogen gas generation unit, the nitrogen gas generation unit, and the gas mixing unit may be housed inside the enclosure.

Such a mixed gas supply device according to (5) not only has a good external appearance, but also has a lower likelihood of damage to the constituent members, piping, valves, and the like, of the units stored inside the enclosure during transport and movement of the device. Furthermore, the internal constituent members, piping, valves, and the like, can be protected from dust in the environment.

(6): The mixed gas supply device according to (4) or (5) may further include a caster provided on the base.

In such a mixed gas supply device according to (6), the entire device can be simply and easily moved on a floor due to the rolling of the casters. Consequently, the entire device can be easily moved near the leak inspection site as necessary without placing an excessive burden on an operator or using a crane. Furthermore, the device can be easily removed from the site after completion of the leak inspection and the like.

(7): In the mixed gas supply device according to any one of (1) to (6), the gas mixing unit may include two serially-connected mixing tanks.

In such a mixed gas supply device according to (7), the gas mixing unit is configured by two serially-connected mixing tanks. Consequently, the mixing tank on the upstream side functions as a buffer, and enables stabilization of the mixed gas supply to be achieved. Furthermore, by achieving homogeneity in the mixed gas, it becomes possible to supply a mixed gas having a homogeneous mixing ratio with certainty.

(8): The mixed gas supply device according to any one of (1) to (7) may further include a gas flow rate ratio controller that controls the ratio between a flow rate of hydrogen gas introduced from the hydrogen gas generation unit into the gas mixing unit via a hydrogen gas supply channel, and a flow rate of nitrogen gas introduced from the nitrogen gas generation unit into the gas mixing unit via a nitrogen gas supply channel.

(9): In the mixed gas supply device according to (8), the gas flow rate ratio controller may include a first mass flow controller provided in the hydrogen gas supply channel, and a second mass flow controller provided in the nitrogen gas supply channel.

(10): The mixed gas supply device according to (8) may further include a direct-acting regulator, and a pilot regulator to which a pilot pressure is applied to by the direct-acting regulator. The gas flow rate ratio controller may include a first sonic nozzle provided in the hydrogen gas supply channel, and a second sonic nozzle provided in the nitrogen gas supply channel. The direct-acting regulator may be provided in one position among a position on the hydrogen gas supply channel, which is on the upstream side of the first sonic nozzle, and a position on the nitrogen gas supply channel, which is on the upstream side of the second sonic nozzle. The pilot regulator may be provided in the other position among the position on the hydrogen gas supply channel and the position on the nitrogen gas supply channel.

(11): In the mixed gas supply device according to any one of (1) to (10), a use of the mixed gas may be a leak inspection.

According to the embodiments of the present invention, for example, as a device for supplying a mixed gas used as an inspection gas in leak inspections and the like, by minimizing the disadvantages associated with the use of gas cylinders by eliminating the use of high-pressure gas cylinders as a gas supply source as much as possible, cost reductions can be achieved in leak inspections and the like, and more efficient operations can also be achieved.

Furthermore, according to the embodiments of the present invention, a hydrogen mixed gas can be safely supplied without coming into contact with hydrogen. Further, a hydrogen mixed gas can be produced inside the device using only air and water. Consequently, the purchase of high-pressure gas cylinders is not necessary, and a hydrogen mixed gas can be produced and supplied at the time a hydrogen mixed gas is used. Consequently, the level of convenience is high, and running costs can be reduced.

Although preferred embodiments of the present invention have been described above, these embodiments are merely one example within the scope of the gist of the present invention, and additions, omissions, substitutions, and other changes are possible within a scope that does not depart from the gist of the present invention, That is to say, the present invention is in no way limited to the above description, and can be appropriately changed within a scope limited only by the claims.

The present invention may be applied to a mixed gas supply device.

What is claimed is:

1. A mixed gas supply device comprising:
a hydrogen gas generation unit that includes a hydrogen generator, the hydrogen generator generating hydrogen gas by decomposition of water and supplying the hydrogen gas;
a nitrogen gas generation unit that includes a filter, the filter separating nitrogen gas from air and supplying the nitrogen gas;
a gas mixing unit that mixes the supplied hydrogen gas and the supplied nitrogen gas and generates mix gas including the hydrogen gas and the nitrogen gas, the gas mixing unit including a first mixing tank having a first capacity and a second mixing tank having a second capacity smaller than the first capacity, the first mixing tank and the second mixing tank being connected to each other in series such that the supplied hydrogen gas and the supplied nitrogen gas are first mixed in the first mixing tank and then supplied to the second mixing tank to be second mixed in the second mixing tank after being first mixed in the first mixing tank to thereby generate the mix gas; and
a single base on which the hydrogen gas generation unit, the nitrogen gas generation unit, and the gas mixing unit are mounted, the hydrogen gas generation unit, the nitrogen gas generation unit, and the gas mixing unit being integrated,
wherein the gas mixing unit supplies the generated mix gas to outside.

2. The mixed gas supply device according to claim 1, further comprising:
a single enclosure provided on the base,
wherein the hydrogen gas generation unit, the nitrogen gas generation unit, and the gas mixing unit are housed inside the single enclosure.

3. The mixed gas supply device according to claim 1, further comprising:
a caster provided on the base.

4. The mixed gas supply device according to claim 1, further comprising:
a gas flow rate ratio controller that controls a ratio between a flow rate of the hydrogen gas supplied by the hydrogen generator via a hydrogen gas supply channel, and a flow rate of the nitrogen gas supplied by the filter via a nitrogen gas supply channel.

5. The mixed gas supply device according to claim 4, wherein the gas flow rate ratio controller includes a first mass flow controller provided in the hydrogen gas supply channel, and a second mass flow controller provided in the nitrogen gas supply channel.

6. The mixed gas supply device according to claim 4, further comprising:
a direct-acting regulator, and
a pilot regulator to which a pilot pressure is applied by the direct-acting regulator,
wherein the gas flow rate ratio controller includes a first sonic nozzle provided in the hydrogen gas supply channel, and a second sonic nozzle provided in the nitrogen gas supply channel,
the direct-acting regulator is provided in a first position on the hydrogen gas supply channel, the first position being on an upstream side of the first sonic nozzle, and
the pilot regulator is provided in a second position on the nitrogen gas supply channel, the second position being on an upstream side of the second sonic nozzle.

7. The mixed gas supply device according to claim 4, further comprising:
a direct-acting regulator, and
a pilot regulator to which a pilot pressure is applied by the direct-acting regulator,
wherein the gas flow rate ratio controller includes a first sonic nozzle provided in the hydrogen gas supply channel, and a second sonic nozzle provided in the nitrogen gas supply channel,
the pilot regulator is provided in a first position on the hydrogen gas supply channel, the first position being on an upstream side of the first sonic nozzle, and
the direct-acting regulator is provided in a second position on the nitrogen gas supply channel, the second position being on an upstream side of the second sonic nozzle.

8. The mixed gas supply device according to claim 1, wherein the generated mix gas is configured to be used in a leak inspection.

9. A mixed gas supply device comprising:
an enclosure;
a water tank that is provided in the enclosure and stores water;
a hydrogen generator that generates hydrogen gas by decomposition of the water stored in the water tank and supplies the hydrogen gas;
an air intake port that is provided on the enclosure, and takes in air to introduce the air inside the enclosure;
a filter that is provided in the enclosure, and separates nitrogen gas from the introduced air and supplies the nitrogen gas;
a mixing unit that is provided in the enclosure, and mixes the supplied hydrogen gas and the supplied nitrogen gas and generates mix gas including the hydrogen gas and the nitrogen gas, the mixing unit including a first mixing tank having a first capacity and a second mixing tank having a second capacity smaller than the first capacity, the first mixing tank and the second mixing tank being connected to each other in series such that the supplied hydrogen gas and the supplied nitrogen gas are first mixed in the first mixing tank and then supplied to the second mixing tank to be second mixed in the second mixing tank after being first mixed in the first mixing tank to thereby generate the mix gas; and
a mixed gas supply port that is provided on the enclosure and supplies the generated mix gas to outside of the enclosure.

10. The mixed gas supply device according to claim 9, further comprising:
a caster provided on the enclosure.

11. The mixed gas supply device according to claim 9, further comprising:
a water level gauge that detects an amount of the water that is stored in the water tank.

12. The mixed gas supply device according to claim 11, wherein the water level gauge generates an alarm in response to the amount of the water falling below a certain level.

* * * * *